United States Patent [19]

Stevens et al.

[11] Patent Number: 4,863,687
[45] Date of Patent: Sep. 5, 1989

[54] METHOD FOR REMOVING MALODOROUS OR TOXIC GASES FROM AN AIR STREAM

[75] Inventors: Samuel R. D. Stevens, Thornhill; Pauline M. Brown, Toronto, both of Canada

[73] Assignee: Solarchem Enterprises Inc., Richmond Hill, Canada

[21] Appl. No.: 912,016

[22] Filed: Sep. 26, 1986

[51] Int. Cl.$^4$ ............................................. A61L 9/015
[52] U.S. Cl. .................................... 422/4; 204/157.3; 204/158.2; 422/5
[58] Field of Search ..................... 422/4, 5; 204/157.3, 204/158.2

[56] References Cited

U.S. PATENT DOCUMENTS

| | | |
|---|---|---|
| 3,657,087 | 4/1972 | Scott . |
| 3,844,914 | 10/1974 | Murchison . |
| 3,933,980 | 1/1976 | Smalheiser . |
| 3,977,952 | 8/1976 | Knoevenagel . |
| 4,045,316 | 8/1977 | Legan . |
| 4,108,746 | 8/1978 | Mill et al. . |
| 4,110,183 | 8/1978 | Furuta . |

FOREIGN PATENT DOCUMENTS

| | | |
|---|---|---|
| 52-66872 | 6/1977 | Japan . |
| 53-34670 | 3/1978 | Japan . |
| 55-88831 | 7/1980 | Japan . |
| 55-109431 | 8/1980 | Japan . |
| 57-130531 | 8/1982 | Japan . |
| 104693 | 6/1983 | Japan ................................ 204/158.2 |

OTHER PUBLICATIONS

Letter from Dr. Barker, of the Electricity Council Research Centre, Capenhurst, Chester, England, dated Nov. 33rd, 1986, and enclosure.
Improving the Efficiency of Ozone in Odour Treatment by Activating with UV light, by Dr. Barker, Mar. 1979.
Aug. 1986, issue of Chemistry in Britain, p. 31.01.

Primary Examiner—Barry S. Richman
Assistant Examiner—Jill Johnston
Attorney, Agent, or Firm—Rogers, Bereskin & Parr

[57] ABSTRACT

Method for removing a malodorous or toxic gas from an industrial exhaust air stream in the presence of ozone and water by applying radiation to a plurality of reaction zones sequentially aligned in the air stream. The reaction is maintained at optimal efficiency by adjusting both the ozone concentration and the radiation intensity.

9 Claims, 1 Drawing Sheet

METHOD FOR REMOVING MALODOROUS OR TOXIC GASES FROM AN AIR STREAM

FIELD OF THE INVENTION

This invention relates to a method for removing malodorous or toxic gases from an air stream using radiation. The invention has particular application to the removal of such gases from the high volume exhaust air streams of industrial plants.

BACKGROUND OF THE INVENTION

Malodorous and toxic gases comprise a wide class of gases many of which are oxidizable. Such oxidizable malodorous gases include aromatic compounds (e.g. xylene), ketones (e.g. methylvinyl ketone), esters (e.g. ethoxyethylacetate), mercaptans (e.g. methyl mercaptan), amines (e.g. dimethylamine) and napthalene. Such oxidizable toxic gases include ethylene oxide, isocyanates, benzene, and polycyclic aromatic hydrocarbons. Numerous technologies exist for the removal of such malodorous or toxic gases from industrial exhaust air streams where the concentration of the malodorous or toxic gas is high, for example, where the concentrations are greater than 500 ppm. However, it becomes exponentially more difficult, hence more expensive, to remove such gases as the concentration becomes lower. Yet malodorous gases such as reduced sulphur compounds remain odorous even at concentrations in the order of 1 ppb.

Eliminating malodorous or toxic gases may be achieved by any of a number of known radicals, for example, OH, $HO_2$, O, $O(^3P)$, $CH_3O$ and $CH_3O_2$. Of these the most reactive radical, and the most powerful oxidizing agent generally, next to fluorine, is OH. In atmospheric chemistry, reactions involving the OH radical have been found to be the principal removal process for gaseous atmospheric pollutants.

However, to completely remove a malodorous or toxic gas from a high volume industrial exhaust air stream has previously proved difficult. Typically the object was achieved by adding ozone or a similar substance and subjecting the air stream to radiation. Removal efficiency was achieved by arbitrarily increasing the concentration of ozone and the intensity of the radiation in a single reaction zone in the air stream.

SUMMARY OF THE INVENTION

This invention provides for the removal of high or low concentrations of malodorous or toxic gas in an air stream by efficiently producing a high density of OH radicals in a reaction zone to remove a small fixed quantity of the malodorous or toxic gas. Further amounts may be removed in a series of such reaction zones along the air stream. It has been found more efficient to provide a plurality of such zones, each operating optimally rather than to increase arbitrarily the intensity of radiation and the concentration of ozone.

More particularly, a method is provided for the oxidization of malodorous or toxic gas in an air stream having a flow rate F, in the presence of ozone and water, to which air stream is applied radiation in the waveband 210–310 nm. The concentration of the ozone $[O_3]$ and the intensity I of the radiation are maintained so that the dose, D defined as $D=[O_3]\cdot I/F$, remains in the region where the amount of malodorous or toxic gas removed from the air stream varies linearly with the dose. That is, the ratio of amount removed to dose undergoes a sharp change at a point defined as the critical point, and the dose is maintained in the linear region below this point by adjusting the concentration of ozone and the intensity of the radiation.

In another embodiment the process outlined above is applied to at least two distinct sequential aligned reaction zones of the exhaust air stream, where the reaction zones are separated by sufficient distance that the by-products of oxidization of the malodorous or toxic gases in the upstream reaction zone have substantially oxidized before reaching the downstream reaction zone.

Further summary of the invention is found in the claims forming part of this patent.

BRIEF DESCRIPTION OF THE DRAWINGS

A detailed description of the invention by way of example, together with a description of the principle of operation of the invention, will now be given with reference to the drawings in which.

DESCRIPTION OF THE INVENTION

General Principles

This invention utilizes the powerful oxidizing OH radical to oxidize malodorous or toxic gases. The OH radical reacts with all organic molecules with reaction rates of between $10^{-10}$ cm$^3$/mol·sec and $10^{-15}$ cm$^3$/mol·sec. The OH radical may be created by a number of processes. One of the most rapid having a rate constant of about $2\times10^{-10}$ cm$^3$/mol·sec. is the reaction: $O(^1D)+H_2O\rightarrow 2OH$. The $O(^1D)$ radical may be provided by the exposure of ozone to ultraviolet radiation having wavelength less than 310 nm.

The $O(^1D)$ radical is collisionally deactivated in air by reacting with $N_2$ and $O_2$ to form $O(^3P)$ and reacts with water to form the OH radical. At normal air density and humidity at room temperature about 15% of the $O(^1D)$ radical formed in the photo-dissociation of ozone reacts to form the OH radical.

Thus exposure of a humid air stream to ultraviolet radiation of wavelength less than 310 nm yields a high density of the OH radical which has been found to be capable of oxidizing malodorous or toxic gases present in the reaction zone of the air stream.

The reaction of the $O(^1D)$ radical with $H_2O$ has been found to be relatively insensitive to the concentration of water in the air stream, providing some water is present. However, we have found it desirable to maintain the humidity of the air stream above about 50 ppm.

MAXIMIZING THE PROCESS EFFICIENCY

In analyzing the reaction process of OH in an air stream containing a malodorous or toxic gas, we define a quantity called the dose, D, as follows:

$$D=[O_3]\cdot I/F$$

where $[O_3]$ is the concentration of ozone in the air stream, I is the intensity of the ultraviolet radiation applied to the air stream and F is the flow rate of the air stream. D is a measure of the OH formed.

Figure 1:
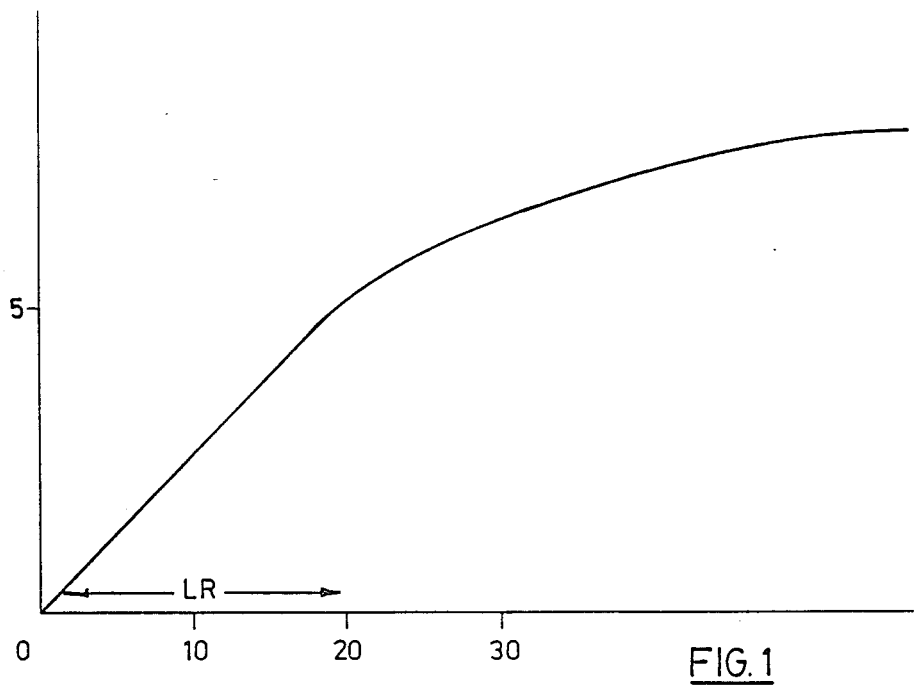
FIG. 1 is a graph summarizing experimental data illustrating advantages to be obtained with the present process.

We have found that the removal efficiency of the process decreases as D increases beyond a certain level which we call the critical region or critical point. Thus, the amount of malodorous substance removed various linearly with D up to the critical point. Above the critical point, while increasing D by an amount $\Delta$ D increases the amount removed, the amount removed by each additional $\Delta$ D is less than the amount removed by an increase of $\Delta$ D in the linear region (shown at LR). This variation of amount removed (Y) with D is illustrated in FIG. 1. Y has units moles$\times 10^8$/l.

Without being bound by the following, we believe that the reduced efficiency of the process when D is above the critical region is caused by the reaction of OH with by-products from the oxidization of the malodorous or toxic gas. The utilization of OH by the by-products reduces the amount of OH available to oxidize the malodorous or toxic gas.

For example, in the oxidization of xylene in an air stream, where the flow rate of the air strem is 1000 m$^3$/min. (which is typical of industrial exhaust air streams), the concentration of ozone is 330 $\mu$g/l, and I/F is 0.058, then the critical point occurs at about D=19 watt·min·$\mu$g/l$^2$. This corresponds to the removal of about 5 ppm xylene.

It is therefore desirable for greatest efficiency, to operate with D about or less than 19 in the case of xylene. Thus, in practice, I and [O$_3$] may be adjusted so that D is maintained in the required region.

For oxidization of methylethylketone and ethoxyethylacetate, we find that the critical dose is also approximately 19. Also, since D is derived from the relation $I_{abs} = \epsilon I_o [O_3] \cdot L$ where L is the path length, is the extinction co-efficient, [O$_3$] is concentration of ozone, $I_o$ is the radiation applied and $I_{abs}$, the absorbed radiation, is a measure of the rate at which O($^1$D) is produced, we expect any organic gas whose reaction rate constant with the OH radical is about $10^{-11}$ or $10^{-12}$ cm$^3$/molecules-sec to have the same critical dose.

Since our understanding is that the existence of an optimal removal region depends on the decomposition of products formed by the oxidization of the malodorous or toxic gas, the process described here will efficiently oxidize any oxidizable malodorous or toxic gas of sufficient complexity that it initially decomposes into intermediate products. In particular, we can predict that the process will efficiently oxidize the classes of compounds defined in the background section of this patent. Thus, for example, as noted above, we have tested members of the classes: aromatic compounds, ketones and esters. Also, as noted above, these were found to have D equal to about 19 at the critical point. For other compounds with different reaction rates, other values of D may be expected, but we can predict that the linear region will exist for other sufficiently complex compounds of these classes and oxidizable malodorous or toxic gases having intermediate by-products of decomposition.

Additional Reaction Zones

The process therefore operates most efficiently with the removal of a fixed small quantity of the malodorous or toxic gas in the reaction zone. To remove greater amounts, it is preferably to increase the number of reaction zones rather than increase the concentration of ozone or the intensity of the radiation.

For example, for complete removal of 40 ppm of xylene, eight separate reaction zones are used each 1 m. apart along a duct confining an air stream containing industrial exhaust gases. By sequentially aligning the reaction zones, the contaminants are constrained to move from one reaction zone to the next. The distance apart is dictated by the desirability of allowing the by-products from the upstream reaction zone to fully oxidize before reaching the downstream reaction zone. This avoids wasting OH redicals produced in the down stream reaction zone for the oxidization of by-products. The optimum distance may be determined by taking samples of air stream at intervals to determine if the products of decomposition of the malodorous or toxic gas have themselves decomposed.

Radiation Source

Ozone has an absorption spectrum with a strong band ($\epsilon \approx 3,000$ l/mole·cm) peaking at about 254 nm and falling away to values less than 100 l/mole·cm at values around 200 nm and 300 nm. Accordingly it is desirable that the radiation source for the invention have high power in the region between 210–310 nm, particularly near 254 nm. We have found that commercially available high pressure mercury lamps are suitable although low pressure mercury arcs with power at 254 nm above about 150W could be used. The invention does not require use of radiation below 210 nm. Accordingly, loss of such radiation from the mercury lamps by passage through quartz windows used to protect the mercury arc from the constituents of the air stream does not effect the operation of the invention. Thus high quality quartz windows are not required.

Apparatus

Figure 2:
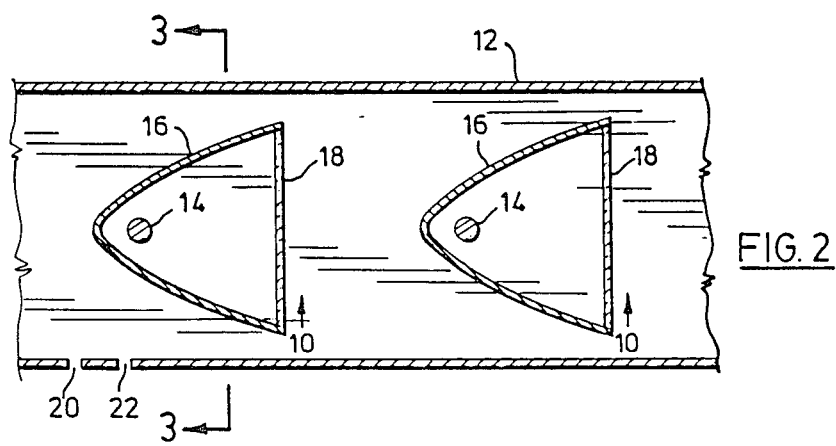
FIG. 2 is a schematic view of a typical apparatus for carrying out the process according to the invention.

FIG. 2 illustrates the use of several reaction zones indicated generally at 10 in a linear sequence in an air duct 12. Air flow in the duct is indicated by the arrow F.

Industrial air ducts such as are used to confine the air stream are generally rectangular or square in cross-section, but the invention may be adapted to operate in virtually any shape of air duct. Typical duct dimensions at the radiation source are of the order 1–2 m.

In FIG. 2, mercury arcs 14 or other radiation sources are supported within the duct 12 by supports (not shown) mounted on the walls of the duct 12. The arcs 14 are located at the focus of the parabolic mirrors 16, also supported on supports (not shown) on the walls of the duct 12. Impervious quartz windows 18 mounted in or adjacent the apertures defined by the parabolic mirrors 16 seal off the mercury arcs 14 from the contents of the air stream. The mirrors 16 and windows 18 provide protection for the mercury arcs 14 from the constituents of the air stream which may contain liquid or solid particles. The mirrors 16 may terminate laterally in impervious walls (not shown) separate from the walls of the duct if desired.

The volume defined by the mirrors 16 and windows 18 may be filled with an inert gas to avoid formation of ozone in the volume defined by the window 18 and the mirror 16. Quartz windows 18 are made of quartz, commercially available, that are transparent to radiation in the waveband 210–310 nm and allow passage of the radiation into the reaction zones 10. If desired, special quartz windows may be used that allow passage of other radiation. The windows 18 may be slidably mounted for ease of cleaning or may be cleaned with wiper blades or an equivalent mechanism.

In some applications it may be desired to protect the mercury arcs 14 by envelopes of quartz, for example, quartz cylinders surrounding the arcs 14. In that case, the windows 18 may be redundant.

Mercury arcs 14 are preferentially adjustable high pressure mercury arcs having a power of between 1 kw and 60 kw with strong emission in the waveband between 210 nm and 310 nm. Such arcs are commercially available. However, commercially available low or medium pressure mercury arcs or other radiation sources may be used depending on the application.

Figure 3:
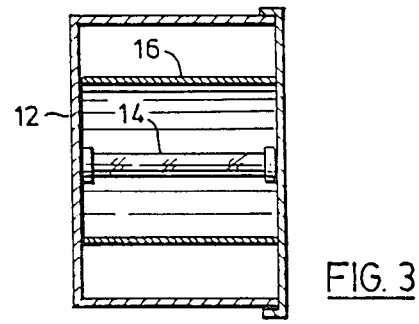
FIG. 3 is a schematic cross-section through an industrial exhaust duct showing two parabolic mirrors disposed side-by-side within the duct.

Parabolic mirrors 16 may be made of aluminimum or other reflecting material. Several mirrors may be placed side-by-side (sideways being defined as the direction perpendicular to the axis of the mercury arcs and perpendicular to the direction of flow of the air stream) with gaps between each of the mirrors 16 and the walls of the duct 12 so that the air stream may flow around the mirrors 16. (See FIG. 3) The mirrors 16 and windows 18 shield the arcs 14 from debris, such as airborne particles and droplets, and collimate the radiation emitted from the arcs 14 so that the radiation is directed downstream.

Other shapes of mirror may be used. For example, V-shaped or circular mirrors could be used, but with a loss of efficiency. The shapes are defined here in a plane of cross-section parallel to the flow of the air stream and are preferentially uniformly shaped in a direction perpendicular to this plane. If other radiation sources are used that, unlike the mercury arcs 14, are not a line source, but are a point source, then the mirrors 16 could define surfaces of rotation about the direction of flow. For example, we have used parabolic mirrors having a defining equation of $4py=x^2$ with $p=5/3$.

The more radiation that is directed downstream or given a downstream component so as to avoid or delay absorbance of the radiation in the duct walls, the more efficient the oxidization of the gas in the reaction gases. Hence it is clear that other configurations of mirrors could be used but at a loss of efficiency.

If the apparatus described here is operated with a process that requires addition of gases not present in the air stream or present but in inadequate quantities, inlets 20 and 22 may be used to allow addition of gases such as ozone and water to the air stream. If desired, additional inlets (not shown) may be used for the addition of gases at other locations in the duct.

The reaction of the malodorous gas with OH or other oxidizing radicals takes place primarily in a very short distance from the quartz window 18. In the case of $I/F=0.058$ watt-min/l and $[O_3]\cdot I/F=19$ watt·min $\mu g/l^2$ and xylene, the path length for substantially all of the OH radical to react with the xylene is less than about 10 cm.

EXAMPLE

We have, for example, removed xylene having a concentration of 10 ppm for an air stream having a flow rate of 2,500 l/min. We used two mercury arcs in series, each of 160 W power in the waveband 210–310 nm. These were placed in a duct 30 cm×30 cm and were protected by cylindrical quartz windows from the air stream. Parabolic aluminum mirrors 30 cm high, 10 cm deep and 15 cm wide were placed around the arcs. Each mirror had the shape defined by $4py=x^2$ with $p=5/3$. With $I/F=0.058$, $[O_3]=330$ $\mu g/l$ (about 160 ppm), concentration of water at 20,000 ppm and T=25° C. we were able to remove 5 ppm for each dose (D=19).

By application of this method we were able to remove xylene from the air stream so that it was undetectable by normal sampling techniques. The efficiency of the removal, defined as concentration removed per unit dose of input was 0.263 ppm per dose unit at these conditions.

We claim:

1. A method of removing an oxidizable malodorous or toxic gas from an air stream wherein the initial concentration of said oxidizable malodorous or toxic gas exceeds the maximum concentration of the linear range of the relationship between the concentration of said gas and the value of $[O_3] \times I/F$ as defined below, comprising applying radiation in the wave band 210–310 nm to a first reaction zone of said air stream and to a second reaction zone of said air stream, each in the presence of ozone and water, said second reaction zone being separated from said first reaction zone by sufficient distance that the by-products of oxidization in said first reaction zone have substantially decomposed before reaching said second reaction zone, the radiation intensity I and the ozone concentration $[O_3]$ being limited in each reaction zone so that the value of $[O_3] \times I/F$, where F is the flow rate of the air stream, remains linearly dependent upon with the amount of oxidizable malodorous or toxic gas which is removed from the air stream.

2. The method of claim 1, in which the gas removed is an aromatic compound, a ketone or an ester.

3. The method of claim 2 in which the gas removed has a reaction rate constant with OH of about $10^{-11}$ to $10^{-12}$ cm$^3$/mol·sec.

4. The method of claim 1, in which the gas removed is xylene, methylethylketone or ethoxyethylacetate.

5. The method of claim 4, in which the product of the intensity of the radiation and the concentration of ozone divided by the flow rate is less than about 19 watt min $\mu g/l^2$.

6. The method of claim 5 in which each reaction zone is about 10 cm. long in the direction of air stream flow and the reaction zones are separated by about 1 meter.

7. The method of claim 1 in which each reaction zone is about 10 cm long in the direction of air stream flow and the reaction zones are separated by about 1 meter.

8. The method of claim 7, wherein a low or high pressure mercury vapour lamp is used to provide radiation in the wave band 210–310 nm.

9. The method of claim 1, wherein a low or high pressure mercury vapour lamp is used to provide radiation in the wave band 210–310 nm.

* * * * *